United States Patent [19]
Vriesen et al.

[11] 3,748,199
[45] July 24, 1973

[54] COMPOSITE PROPELLANTS CONTAINING HYDROXYLAMMONIUM PERCHLORATE

[75] Inventors: Calvin W. Vriesen, Newark, Del.; John C. Merges, Jr., Oxford, Pa.

[73] Assignee: Thiokol Chemical Corporation, Bristol, Pa.

[22] Filed: Sept. 23, 1965

[21] Appl. No.: 490,777

[52] U.S. Cl. .................................. 149/19, 149/20
[51] Int. Cl. ............................................ C06d 5/06
[58] Field of Search .................. 149/19, 20, 76, 75

[56] References Cited
UNITED STATES PATENTS

| | | | |
|---|---|---|---|
| 2,768,874 | 10/1956 | Robson | 23/85 |
| 3,026,672 | 3/1962 | Sammons | 149/76 X |
| 3,305,413 | 2/1967 | Flynn et al. | 149/19 |

*Primary Examiner*—Benjamin R. Padgett
*Attorney*—Thomas W. Brennan

[57] ABSTRACT

A castable propellant composition including suitable curing agent(s) and a curable fuel binder(s) having a novel oxidizer, hydroxylammonium perchlorate. Optional propellant adjuvants are also disclosed for improving and/or increasing various propellant physical and chemical combustion characteristics.

13 Claims, No Drawings

COMPOSITE PROPELLANTS CONTAINING HYDROXYLAMMONIUM PERCHLORATE

This invention relates to a novel oxidizer useful in solid propellant compositions.

More particularly, this invention concerns a method for using hydroxylammonium perchlorate as a solid propellant oxidizer and the propellant compositions resulting therein.

Stability, high specific impulse and high density are three desirable characteristics for oxidizers used in solid propellant compositions. The first of these characteristics permits the safe loading and handling of the rocket while the latter two factors influence the thrust and load capacity of the propellant.

Currently ammonium perchlorate is the most widely employed oxidizer for solid propellant compositions. This oxidizer is not only stable to heat and vibration, but it has a high specific impulse, high density, and it can be cured readily in a variety of polymeric fuel binders to yield a rocket motor with good physical and aging properties.

With the contemplation of potential military or commercial aerospace vehicles, the need for heavier rocket payloads has arisen. This in turn has created a need for rockets capable of significantly higher thrusts in order to lift these increased payloads. While the thrust of rocket motors containing present day propellants could be increased by increasing the size of the rocket motor, a change in the dimensions of well established hardware systems is exceedingly time consuming and costly and hence impractical. Ideally, the thrust of rocket motors would be increased by the efficient use of new and more powerful oxidizers. These novel oxidizers would enable the thrust of the rocket motor to be increased using the same size or smaller rocket hardware. In addition, the new oxidizers would retain the good stability and density of the current standard oxidizer ammonium perchlorate. This method of increasing rocket thrust would represent a substantial advance in the art.

Thus, it is an object of this invention to utilize a heretofore unused solid propellant oxidizer.

A more specific object is the development of an oxidizer having improved specific impulse and density as compared to ammonium perchlorate.

Another object is to increase the thrust of rocket motors without increasing rocket motor size.

A further object is the development of new propellant compositions having good physical and aging characteristics.

Other objects will become apparent to those skilled in the art after a further reading of this application.

The above objects among others are achieved by the inclusion of major amounts of hydroxylammonium perchlorate into solid propellant compositions as an oxidizer or as an oxidizer additive.

In its broadest compositional aspect, this invention comprises a homogeneous curable mixture of the components described below:

1. from about 45 – 80 parts by weight of oxidizer including hydroxylammonium perchlorate oxidizer,
2. from about 10 – 50 parts by weight of a combustible fuel binder, and
3. from about 0 – 30 parts by weight of optional propellant adjuvants.

To more clearly set forth some of the modifications possible in this invention in its composition aspect, the fuel binder and adjuvant components are described in more detail below.

1. Combustible Fuel Binder

In carrying out the present invention, numerous combinations of polymeric materials (or their precursors) are compatible with the oxidizer and optional adjuvants, and they can be cured to the desired state of hardness safely and consistently. In this discussion and throughout this application, the combustible fuel binder content is understood to include not only the polymeric material, but also the relatively small amounts of curing agents, curing catalysts, curing accelerators, stabilizers and the like used to impart the desired physical characteristics to the final rocket motor.

The polymeric fuel binders of this invention will generally vary in molecular weight between about 500 to 12,000 although somewhat higher and lower molecular weights can be used. The binders can be low viscosity, easily flowing liquids, high viscosity fluids or solids that can be comminuted to the desired particle size. Fuel binders having substantial alkylene $[(CH_2)n]$ content in the molecule are generally favored. These include the polyethenes, polyamides, the polyesters, the polyepoxides (polyoxiranes), the polycarbonates, the polyurethanes, the polyacrylates and the like as well as these polymers or other polymers modified to contain epoxy groups, carboxy, hydroxy groups, nitro and/or fluorine. This latter group, especially the isocyanate, epoxy and hydroxy containing hydrocarbons such as the polyalkadienes are the preferred polymeric binders of this invention. The modifying groups can be terminal or secondary.

An especially favored group of polymers in this invention are the following: castor oil or its equivalent glyceryl triricinoleate, hydroxy containing or hydroxy terminated polyisobutylene or hydroxy terminated polybutadiene, hydroxy terminated copolymers of butadiene and acrylonitrile, copolymers of butadiene and styrene, polyethers such as polytetramethylene glycol and polypropylene ether glycols and hydroxy terminated polyesters.

As indicated earlier, the polymers can be used in the form of their activated reaction mixtures. For example, the polyesters can be prepared from various combinations of polyhydric alcohols and dibasic acids. Polyhydric alcohols that can be used in preparing the linear polyesters include ethylene glycol, diethylene glycol, propylene glycol, polypropylene glycol, butane diols, pentanediols, hexanediols, glycerol, trimethylolpropane, 1,2,6-hexane triol, castor oil, ethylene and propylene oxide extended glycerol or 1,2,6-hexane triol (commerically known as Niax Triols) and mixtures of these polyols. Suitable polybasic acids for reacting with the foregoing alcohols to form the linear polyesters include oxalic, adipic, sebacic, phthalic, isophthalic, terephtahalic, malonic, succinic, maleic, fumeric, azelaic, dodecanedioic, dimer and itaconic acids and mixtures of these acids. The alcohols and acids having more than two functional groups can be used in varying amounts in the reaction mixture to produce varying amounts of crosslinking. Since the linear polyesters are well known in the art, it is deemed unnecessary to describe in detail methods for making them.

The hydroxy-terminated prepolymers can be cured by means of carboxylic anhydrides and oxiranes among other curing agents. Typical anhydrides useful for this purpose are dodecenyl succinic anhydride and "Methyl nadic anhydride." This is tradename for methylated maleic acid adduct of phthalic anhydride. Typical oxirane materials useful for this purpose include the diglycidyl ether of bis-phenol A sold under the name "Epi-Rez 510 or ERL–2795" by the Jones-Dabney Company, Louisville, Ky., having an Epoxy Equivalent of about 180–250, the diglycidyl ether of bis-phenol F having an E.E.W. of 180–184, sold by the Bakelite Company, cyclopentadiene dioxide, butadiene dioxide, vinylcyclohexene dioxide (sold as Epoxide 206) by Carbide & Carbon and the 4,5-epoxy-2-2methyl cyclohexyl) methyl ester of 4,5-epoxy-2-methyl cyclohexane carboxylic acid (sold as Epoxide 201) by the Carbide & Carbon Corporation. The hydroxy-terminated prepolymers can also be cured with diisocyanate compounds such as 2,4-toluene diisocyanate, mixtures of 2,4- and 2,6-toluene diisocyanates, hexamethylene diisocyanate, diphenylmethane-4,4'-diisocyanate, 3,3'-bitoluene-4,4'-diisocyanate, 3,3'-dimethyl-diphenylmethane-4,4'-diisocyanate. In another method, the hydroxy-terminated prepolymer is precombined with the diisocyanato compound, and the resulting fluid prepolymer is cured with a polyhydric alcohol selected from the list presented above. An example would be the treatment of one mole of castor oil with twice the amount of toluene diisocyanate required to react with all of the available hydroxy groups. This fluid prepolymer can be cured with a polyhydric alcohol, including castor oil itself. The use of a diisocyanate terminated polymer by this procedure reduces the hazards encountered in handling free toluene diisocyanate.

Oxirane-terminated or containing prepolymers can also be utilized and an example of this is a commercially obtained oxirane-terminated polybutadiene resin having an epoxy value of about 0.05 eq/100 g. This polymer can be cured by means of catalysts such as stannous octoate, tetrabutyl titanate and polyamines such as 4,4'-diaminodiphenylmethane, 4,4'-methylene-bis-(2-chloroaniline), triethylenetetramine, m-phenylenediamine and 4,4'-diaminobenzophenone.

2. Propellant Adjuvants

In addition to the curing agents, solvents, polymerization and curing agents catalysts and the like which are included within the fuel binder content of the inventive propellant compositions, certain conditioning or modifying agents can often be advantageously added to gas-generating compositions to alter or improve their physical and combustion characteristics. For convenience sake, these substances are herein generically referred to as propellant adjuvants and they can be present in the finished propellant composition in amounts from up to about 30 parts by weight down to 0 parts by weight of the final gas-generating composition.

More commonly, however, the adjuvants comprise from about 0.25 parts by weight or even less, up to about 5 parts by weight of the propellant composition. Among the many propellant adjuvants which can be used are included the following typical materials: plasticizers such as the alkylphthalates and the like, ballistic agents such as ferrocene, hygroscopicity inhibitors such as magnesium oxide and various combustion catalysts. The combustion catalysts are of diverse structure but generally are compounds containing oxygen. These catalysts can be inorganic or organic compounds. They include, among many others, oxides, such as magnesium, iron, copper, titanium, calcium, molybdenum, and vanadium oxides and the like. Especially effective as combustion catalysts are chromium compounds with copper chromite being a preferred catalyst. Other satisfactory combustion catalysts include metallo organics such as iron and cobalt dicyclopentadienyl, and ferric and cobalt acetyl acetonate and certain dyes including copper phthalocyanine.

Organics such as nitrocellulose can also be effectively used. In addition to the above adjuvants, numerous metals can be incorporated into the propellant mix prior to curing. These include metals such as lithium, magnesium, aluminum, beryllium, titanium, zirconium or mixtures of these metals, preferably in the form of their powders. Another valuable group of high energy additives which can be used include the metalloids such as silicon and/or boron, the carbides and hydrides of silicon and boron as well as the silicides, carbides and hydrides of metals such as beryllium, aluminum, lithium, magnesium and the like.

3. Preferred Propellant Compositions

As indicated supra, for various reasons, certain individual components of the propellant compositions are preferred over others. Thus, the preferred propellant compositions of this invention are made up of the compositions described below:

1. from about 50 – 65 parts by weight of hydroxylammonium perchlorate oxidizer
2. from about 12 – 25 parts by weight of a polymer selected from the group consisting of hydroxy-terminated butadienes, oxirane-terminated polybutadiene fuel binder, toluene diisocyanate-terminated castor oils and hydroxy-terminated copolymers of butadiene and styrene, said polymers ranging in molecular weight between about 500 to 12,000.
3. from about 10 – 25 parts by weight of a propellant adjuvant selected from the group consisting of aluminum and beryllium.

4. Compounding the Ingredients

In preparing the solid propellant composition, the following preferred procedure among many others can be used.

A mixture of the dried, finely divided hydroxylammonium perchlorate curing agent(s) and the combustible fuel binder are placed in a blending vessel equipped with an efficient spark proof mixer and blended to a homogeneous mixture. To this mixture is added an optional propellant adjuvants such as the finely divided high energy metals or metalloids. During these additions, efficient mixing is maintained until a homogeneous mixture results. The total mixing time necessary for a uniform mixture varies according to the batch size but ordinarily at least 30 minutes of mixing is required with 90 minutes or more representing the extreme time. Finally the necessary catalysts are added and the mixing continued for an additional one-half to 1 hour. Finally the uniformally blended uncured viscous propellant composition is cast into a mold of the desired configuration and the propellant mix is cured at the required temperature until the desired hardness is obtained. The temperature during the blending operation is usually about 60° – 90°F. although higher temperatures can be used if desired. The curing temperatures are dependent upon the particular resin used as a binder and the batch size, among other things, and thus cannot be stated with precision. However, the following ranges of time and temperature are typical for curing propellant compositions containing the fuel binders described below:

| Binder | Range of Curing Temperatures °F. | Range of Curing Time |
|---|---|---|
| Hydroxy-terminated polybutadiene | 80°–135°F. | 6–50 hours |
| Polyurethane containing polymers | 80°–150°F. | 6–70 hours |
| Oxirane containing hydrocarbons | 120°–150°F. | 6–70 hours |

In order to illustrate the preparation and use of the novel solid propellant compositions of this invention, the following illustrative embodiments are submitted:

In one embodiment, a vertical planetary mixer is charged with 15.08 parts of a commercially derived hydroxy-terminated polybutadiene and 2.92 parts of Epoxide 201 and these ingredients are mixed for five minutes. Then 18.00 parts of spherical aluminum powder (26 microns) are added and mixing is carried out for another ten minutes. Thereafter, 48 parts of hydroxylammonium perchlorate (20–40 mesh) and 16 parts of hydroxylammonium perchlorate (40–100 mesh) are added, and mixing is continued for an additional 45 minutes.

A portion of the mixture is deareated and cast into a test rocket engine and cured at ambient temperature. When the test engine is fired, a delivered impulse of 254 seconds (which was 95 percent of theoretical) was obtained and the burning rate is determined to be 0.31 in/sec at 1000 psia with a burning rate exponent of 0.25.

The density of a sample of the cured material is determined to be 0.067 lb/in³.

In another embodiment, the procedure above is followed except that curing is carried out at 135°F. and that the proportions and components are changed as indicated below:

| | |
|---|---|
| Hydroxylammonium perchlorate (20–40 mesh) | 64.00 |
| Aluminum powder (28–36 microns) | 18.00 |
| Hydroxy-terminated copolymer of butadiene and styrene sold and designated by the Sinclair Corporation as CN-15 | 15.40 |
| ERL-2795 | 2.60 |

Test engines are fired and a delivered impulse of 246 seconds, a burning rate of 0.60 in/sec at 1000 psia and a burning rate exponent of 0.49 is measured.

In a further embodiment, the above-described procedure is followed except that the proportions and ingredients are changed as follows:

| | |
|---|---|
| Hydroxylammonium perchlorate (−20+40 mesh) | 48.00 |
| Hydroxylammonium perchlorate (−40+100 mesh) | 16.00 |
| Aluminum powder (28–36 microns) | 18.00 |
| Hydroxy-terminated copolymer of butadiene and acrylonitrile sold and designated by the Sinclair Corporation as CN-15 | 15.72 |
| Epoxide 201 | 2.28 |
| Firing of test engines resulted in the following data: | |
| Delivered Isp, sec. | 257 |
| Burning rate, in/sec, 1839 psia | 0.76 |

A portion of the mixture is prepared as (JANAF) dumbbell-shaped specimens. Thereafter, the specimens are subjected to a tensile test and exhibited a tensile strength of 86 psi, an elongation of 40 per cent and a modulus to 380 psi.

In this embodiment, the above-described procedure is followed using the ingredients and properties as follows:

| | |
|---|---|
| Hydroxylammonium perchlorate | 65.00 |
| Aluminum powder (28–36 microns) | 20.00 |
| Castor oil | 12.03 |
| Toluene diisocyanate | 2.97 |

A portion of the mixture is prepared as dumbbell-shaped specimens. The samples showed a stress of 99 psi, an elongation of 11 percent of a modulus of 2780 psi. The burning rate is determined by burning strands of the cured materials in a Crawford Strand Burner and was found to be 0.82 in/sec with a burning rate exponent of 0.50.

In yet another embodiment, the components described below are mixed and cured at 135°F. for 20 hours.

| | |
|---|---|
| Hydroxylammonium perchlorate | 65.00 |
| Aluminum powder (28–36 microns) | 20.00 |
| Toluene diisocyanate-terminated castor oil | 6.66 |
| Castor oil | 8.34 |

The Shore A durometer reading of the cured sample is 65.

Still a further embodiment is shown by the blending of the components set forth below:

| | |
|---|---|
| Hydroxylammonium perchlorate | 65.00 |
| Aluminum powder (28–36 microns) | 20.00 |
| Castor oil | 9.30 |
| Hexamethylene diisocyanate | 5.70 |

After curing at 135°F. at 24 hours the Shore A durometer reading is 60.

In further embodiments, the previously described procedure is followed to prepare additional propellant compositions. Comparable curing temperatures and times are utilized.

| | |
|---|---|
| Hydroxylammonium perchlorate | 45.00 |
| Ammonium perchlorate | 16.00 |
| Beryllium powder (4–16 microns) | 12.00 |
| Hydroxy-terminated copolymer of butadiene and acrylonitrile sold and designed by the Sinclair Corporation as CN-15 | 17.75 |
| Epoxide 201 | 3.50 |

A further composition is prepared by blending the named ingredients in the quantities shown:

| | |
|---|---|
| Hydroxylammonium perchlorate | 76.00 |
| Aluminum powder (28–36 microns) | 10.00 |
| Castor oil | 15.00 |
| Toluene diisocyanate | 5.00 |

The composition is cured at 135°F. for 24 hours.

Other solid propellant compositions are prepared by blending the components shown below and curing for 30 hours at 135°F.

| | |
|---|---|
| Hydroxylammonium perchlorate | 65.00 |
| Aluminum powder (28–36 microns) | 20.00 |
| Oxirane-terminated polybutadiene having a molecular weight of about 1000 to 2000 | 13.50 |
| 4,4'-methylene dianiline | 1.50 |

After curing at 135°F., the Shore A durometer reading of the cured sample is 55.

| | |
|---|---|
| Hydroxylammonium perchlorate | 65.00 |
| Aluminum powder (28–36 microns) | 20.00 |
| Oxirane-terminated polybutadiene having a molecular weight of about 1000 to 2000 | 14.30 |
| Stannous octoate | 0.70 |

After curing at 135°F., the Shore A durometer reading of the cured sample is 53.

The novel oxidizer of this invention is especially advantageous in several respects when incorporated with a combustible fuel binder and optional adjuvants to form solid propellant compositions.

For example, hydroxylammonium perchlorate based propellants have a theoretical specific impulse of about 273 seconds compared to 265 for comparable solid propellant compositions utilizing ammonium perchlorate. Quite unexpectedly it has been found that hydroxylammonium perchlorate has a density about 5 percent higher than that of ammonium perchlorate. This is especially important since it means that approximately 5 percent more energy is available from the same weight of a hydroxylammonium perchlorate based propellant that is available from a comparable weight of a propellant utilizing ammonium perchlorate.

It is, of course, understood that the foregoing examples are intended to be illustrative only and that numerous changes can be made in the ingredients, proportions and conditions set forth therein without departing from the scope of the present invention. The metes and bounds of this invention are best shown by the claims which folow.

What is claimed is:

1. A homogeneous propellant composition capable of curing to a solid propellant consisting essentially of the following components in the proportions indicated:
   a. from about 45 – 80 parts by weight of dried, finely divided hydroxylammonium perchlorate oxidizer
   b. from about 10 – 50 parts by weight of a polymeric combustible fuel binder including at least one curing agent in admixture therewith for curing said propellant to a predetermined solid state adaptable for use as a propellant in a solid propellant rocket motor.
   c. up to about 30 parts by weight of propellant adjuvants.

2. The composition of claim 1 wherein the combustible fuel binder is a viscous liquid selected from the group consisting of hydroxy containing hydrocarbons, carboxy containing hydrocarbons, isocyanate containing hydrocarbons, polyether containing hydrocarbons and oxirane containing hydrocarbons.

3. A homogeneous propellant composition capable of curing to a solid propellant consisting essentially of the following components in the proportions indicated:
   a. from about 50 – 65 parts by weight of dried, finely divided hydroxylammonium perchlorate oxidizer
   b. from about 12 – 25 parts by weight of a polymeric combustible fuel binder including at least one curing agent in admixture therewith for curing said propellant to a predetermined solid state adaptable for use as the propellant in a solid propellant rocket motor selected from the group consisting of hydroxy containing hydrocarbons, isocyanate containing hydrocarbons and epoxy containing hydrocarbons
   c. from about 10 – 25 parts by weight of a metal selected from the group consisting of beryllium, aluminum, titanium, zirconium and magnesium, their hydrides and carbides.

4. The composition of claim 3 wherein the combustible fuel binder is a hydroxy containing polyalkadiene.

5. The composition of claim 3 wherein the combustible fuel binder is an oxirane containing hydrocarbon.

6. The composition of claim 3 wherein the combustible fuel binder is an isocyanate containing hydrocarbon.

7. The composition of claim 3 wherein the combustible fuel binder is a carboxy containing polyalkadiene.

8. The composition of claim 3 wherein the combustible fuel binder is a hydroxy containing polyether.

9. A homogeneous propellant composition capable of curing to a solid propellant consisting essentially of:
   a. from about 50 – 65 parts by weight of dried, finely divided hydroxylammonium perchlorate oxidizer
   b. from about 12 – 20 parts by weight of polymeric oxirane terminated polybutadiene having a molecular weight ranging from about 500 to about 12,000 and including in admixture therewith at least one curing agent for curing said propellant to a predetermined state adaptable for use as the propellant in a solid propellant rocket motor
   (c) from about 10 – 20 parts by weight of aluminum.

10. A homogeneous propellant composition capable of curing to a solid propellant consisting essentially of the following components in the proportions indicated:
    (a) from about 50 – 65 parts by weight of dried, finely divided hydroxylammonium perchlorate
    (b) from about 12 – 20 parts by weight of a polymeric hydroxy-terminated polybutadiene and including in admixture therewith at least one curing agent for curing said propellant to a predetermined state adaptable for use in a solid propellant rocket motor
    (c) from about 5 – 25 parts by weight of aluminum.

11. A homogeneous propellant composition capable of curing to a solid propellant consisting essentially of the following components in the proportions indicated:
    a. from about 50 – 65 parts by weight of dried, finely divided hydroxylammonium perchlorate
    b. from about 12 – 20 parts by weight of hydroxy-terminated copolymer of butadiene and styrene and including in admixture therewith at least one curing agent for curing said propellant to a predetermined state adaptable for use as the propellant in a solid propellant rocket motor
    c. from about 5 – 25 parts by weight of aluminum.

12. A homogeneous propellant composition capable of curing to a solid propellant consisting essentially of the following components in the proportions indicated:
    a. from about 50 – 65 parts by weight of dried, finely divided hydroxylammonium perchlorate
    b. from about 12 – 20 parts by weight of a hydroxy-terminated copolymer of butadiene and acrylonitrile and including in admixture therewith at least one curing agent for curing said propellant to a predetermined state adaptable for use as the propellant in a solid propellant rocket motor
    c. from about 5 – 25 parts by weight of aluminum.

13. A homogeneous propellant composition capable of curing to a solid propellant consisting essentially of the following components in the proportions indicated:
    a. from about 50 – 65 parts by weight of dried, finely divided hydroxylammonium perchlorate
    b. from about 12 – 20 parts by weight of a polymeric hydroxy-terminated isocyanate-terminated castor oil and including in admixture therewith at least one curing agent for curing said propellant to a predetermined state adaptable for use as the propellant in a solid propellant rocket motor
    c. from about 5 – 25 parts by weight of aluminum.

* * * * *